(12) United States Patent
Gilon et al.

(10) Patent No.: US 8,931,475 B2
(45) Date of Patent: Jan. 13, 2015

(54) SYSTEMS AND METHODS FOR CONTROL OF A SOLAR POWER TOWER USING INFRARED THERMOGRAPHY

(75) Inventors: Yoel Gilon, Jerusalem (IL); Ophir Chernin, Ramat Beit Shemesh (IL); Gideon Goldwine, Jerusalem (IL); Gil Kroyzer, Jerusalem (IL); Rotem Hayut, Jerusalem (IL); Dan Franck, Modi'in (IL); Israel Kroizer, Jerusalem (IL); Ziv Aumann, Jerusalem (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 1228 days.

(21) Appl. No.: 12/500,101

(22) Filed: Jul. 9, 2009

(65) Prior Publication Data

US 2010/0006087 A1 Jan. 14, 2010

Related U.S. Application Data

(60) Provisional application No. 61/079,441, filed on Jul. 10, 2008.

(51) Int. Cl.
*F24J 2/07* (2006.01)
*F24J 2/10* (2006.01)
(Continued)

(52) U.S. Cl.
CPC .... *F24J 2/07* (2013.01); *F24J 2/10* (2013.01); *F24J 2/402* (2013.01); *F24J 2/38* (2013.01); *Y02E 10/41* (2013.01); *Y02E 10/47* (2013.01)
USPC ........... 126/572; 126/600; 126/603; 126/680; 126/601; 126/701

(58) Field of Classification Search
CPC ................. F24J 2/402; F24J 2/07; F24J 2/10; F24J 2/38; Y02E 10/41
USPC ......... 431/600, 603, 680, 681, 696, 701, 714; 126/572, 601, 584, 604, 605, 600, 603, 126/680, 681, 696, 701, 714
See application file for complete search history.

(56) References Cited

U.S. PATENT DOCUMENTS

| 811,274 A | 1/1906 | Carter |
| 2,999,943 A | 9/1961 | Willard |

(Continued)

FOREIGN PATENT DOCUMENTS

| DE | 10248068 | 5/2004 |
| EP | 0106688 | 3/1985 |

(Continued)

OTHER PUBLICATIONS

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

(Continued)

*Primary Examiner* — Avinash Savani
(74) *Attorney, Agent, or Firm* — Miles & Stockbridge P.C.; Mark A. Catan

(57) ABSTRACT

Systems and methods for directly monitoring energy flux of a solar receiver in a solar energy-based power generation system include measuring infrared radiation emanating from the solar receiver. Such measurement can be achieved using one or more infrared thermography detectors, such as an IR camera. Resulting thermal data obtained by the imaging can be used to determine energy flux distribution on the receiver. A user or a system controller can use the determined flux distribution to adjust heliostat aiming to achieve a desired operation condition. For example, heliostats can be adjusted to achieve a uniform energy flux distribution across the external surface of the receiver and/or to maximize heat transfer to a fluid flowing through the receiver within system operating limits.

27 Claims, 6 Drawing Sheets

(51) Int. Cl.
  *F24J 2/40* (2006.01)
  *F24J 2/38* (2014.01)

(56) References Cited

U.S. PATENT DOCUMENTS

| | | | |
|---|---|---|---|
| 3,892,433 A | 7/1975 | Blake | |
| 3,924,604 A | 12/1975 | Anderson | |
| 4,034,735 A | 7/1977 | Waldrip | |
| 4,044,753 A | 8/1977 | Fletcher et al. | |
| 4,102,326 A | 7/1978 | Sommer | |
| 4,117,682 A | 10/1978 | Smith | |
| 4,146,785 A | 3/1979 | Neale | |
| 4,172,443 A | 10/1979 | Sommer | |
| 4,219,729 A | 8/1980 | Smith | |
| 4,227,513 A | 10/1980 | Blake et al. | |
| 4,245,618 A | 1/1981 | Wiener | |
| 4,247,182 A | 1/1981 | Smith | |
| 4,265,223 A | 5/1981 | Miserlis et al. | |
| 4,283,887 A | 8/1981 | Horton et al. | |
| 4,289,114 A | 9/1981 | Zadiraka | |
| 4,297,521 A | 10/1981 | Johnson | |
| 4,331,829 A | 5/1982 | Palazzetti et al. | |
| 4,343,182 A * | 8/1982 | Pompei | 374/31 |
| 4,365,618 A | 12/1982 | Jones | |
| 4,420,032 A * | 12/1983 | Van Koppen et al. | 165/236 |
| 4,438,630 A | 3/1984 | Rowe | |
| 4,459,972 A * | 7/1984 | Moore | 126/600 |
| 4,474,169 A | 10/1984 | Steutermann | |
| 4,485,803 A | 12/1984 | Wiener | |
| 4,490,981 A | 1/1985 | Meckler | |
| 4,512,336 A | 4/1985 | Wiener | |
| 4,564,275 A | 1/1986 | Stone | |
| 4,633,854 A | 1/1987 | Mayrhofer | |
| 4,913,129 A | 4/1990 | Kelly et al. | |
| 5,128,799 A | 7/1992 | Byker | |
| 5,288,147 A * | 2/1994 | Schaefer et al. | 374/10 |
| 5,417,052 A | 5/1995 | Bharathan et al. | |
| 5,578,140 A | 11/1996 | Yogev et al. | |
| 5,592,151 A * | 1/1997 | Rolih | 340/584 |
| 5,759,251 A | 6/1998 | Nakamura et al. | |
| 5,861,947 A * | 1/1999 | Neumann | 356/216 |
| 5,862,799 A * | 1/1999 | Yogev et al. | 126/578 |
| 5,899,199 A | 5/1999 | Mills | |
| 5,905,590 A | 5/1999 | Van Der Sluis et al. | |
| 5,982,481 A | 11/1999 | Stone et al. | |
| 6,021,956 A * | 2/2000 | Haraguchi | 236/51 |
| 6,080,927 A | 6/2000 | Johnson | |
| 6,131,565 A | 10/2000 | Mills | |
| 6,310,725 B1 | 10/2001 | Duine et al. | |
| 6,442,937 B1 * | 9/2002 | Stone et al. | 60/641.11 |
| 6,597,709 B1 | 7/2003 | Diver, Jr. | |
| 6,653,551 B2 | 11/2003 | Chen | |
| 6,662,801 B2 * | 12/2003 | Hayden et al. | 126/571 |
| 6,806,415 B2 * | 10/2004 | Fujisaki et al. | 136/259 |
| 6,818,818 B2 | 11/2004 | Bareis | |
| 6,899,097 B1 | 5/2005 | Mecham | |
| 6,926,440 B2 * | 8/2005 | Litwin | 374/124 |
| 6,957,536 B2 | 10/2005 | Litwin et al. | |
| 6,959,993 B2 | 11/2005 | Gross et al. | |
| 7,042,615 B2 | 5/2006 | Richardson | |
| 7,191,597 B2 | 3/2007 | Goldman | |
| 7,191,736 B2 | 3/2007 | Goldman | |
| 7,207,327 B2 * | 4/2007 | Litwin et al. | 126/601 |
| 7,296,410 B2 | 11/2007 | Litwin | |
| 7,331,178 B2 | 2/2008 | Goldman | |
| 7,340,899 B1 | 3/2008 | Rubak et al. | |
| 7,523,921 B2 | 4/2009 | Garrity | |
| 7,690,377 B2 * | 4/2010 | Goldman et al. | 126/655 |
| 7,884,279 B2 | 2/2011 | Dold et al. | |
| 7,906,750 B2 * | 3/2011 | Hickerson et al. | 250/203.4 |
| 8,001,960 B2 * | 8/2011 | Gilon et al. | 126/600 |
| 8,033,110 B2 * | 10/2011 | Gilon et al. | 60/641.11 |
| 8,327,840 B2 * | 12/2012 | Gilon et al. | 126/600 |
| 8,360,051 B2 * | 1/2013 | Gilon et al. | 126/578 |
| 8,365,718 B2 * | 2/2013 | Gilon et al. | 126/595 |
| 2004/0086021 A1 | 5/2004 | Litwin | |
| 2004/0231716 A1 | 11/2004 | Litwin | |
| 2005/0126170 A1 | 6/2005 | Litwin | |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2007/0272234 A1 | 11/2007 | Allen et al. | |
| 2008/0000436 A1 | 1/2008 | Goldman | |
| 2008/0011288 A1 | 1/2008 | Olsson | |
| 2008/0011290 A1 | 1/2008 | Goldman et al. | |
| 2008/0216821 A1 * | 9/2008 | Sweet | 126/585 |
| 2008/0293132 A1 | 11/2008 | Goldman et al. | |
| 2008/0295883 A1 * | 12/2008 | Ducellier et al. | 136/246 |
| 2008/0314438 A1 | 12/2008 | Tran et al. | |
| 2009/0038608 A1 | 2/2009 | Caldwell | |
| 2009/0056701 A1 | 3/2009 | Mills et al. | |
| 2009/0107485 A1 | 4/2009 | Reznik et al. | |
| 2009/0151769 A1 | 6/2009 | Corbin et al. | |
| 2009/0178668 A1 | 7/2009 | Boggavarapu | |
| 2009/0217921 A1 * | 9/2009 | Gilon et al. | 126/600 |
| 2009/0229264 A1 * | 9/2009 | Gilon et al. | 60/641.8 |
| 2009/0250052 A1 * | 10/2009 | Gilon et al. | 126/684 |
| 2010/0139644 A1 | 6/2010 | Schwarzbach et al. | |
| 2010/0191378 A1 | 7/2010 | Gilon et al. | |
| 2010/0236239 A1 | 9/2010 | Kroizer et al. | |
| 2010/0263709 A1 | 10/2010 | Norman et al. | |
| 2010/0282242 A1 * | 11/2010 | Gilon et al. | 126/600 |
| 2010/0300510 A1 | 12/2010 | Goldman et al. | |
| 2011/0036343 A1 | 2/2011 | Kroyzer et al. | |
| 2011/0088396 A1 | 4/2011 | Katz et al. | |
| 2011/0220091 A1 | 9/2011 | Kroyzer | |
| 2012/0024282 A1 | 2/2012 | Gilon et al. | |

FOREIGN PATENT DOCUMENTS

| | | |
|---|---|---|
| JP | 56-102646 | 8/1981 |
| WO | WO 2004/004016 | 1/2004 |
| WO | WO 2004/067933 | 8/2004 |
| WO | WO 2007/118223 | 10/2007 |
| WO | WO 2008/092194 | 8/2008 |
| WO | WO 2008/092195 | 8/2008 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/064718 | 6/2011 |
| WO | WO 2011/140021 | 11/2011 |
| WO | WO 2012/014153 | 2/2012 |

OTHER PUBLICATIONS

Lopez-Martinez et al., "Vision-based system for the safe operation of a solar power tower plant," *Iberamia*, 2002, LNAI 2527: pp. 943-952.
"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.
Meduri et al., "Performance Characterization and Operation of Esolar's Sierra Suntower Power Tower Plant," SolarPACES 2010 Conference, Sep. 21-24, 2010, Perpignan, France.
Mills et al., "Multi-Tower Solar Array Project," *Proceedings of the Solar Harvest Conference, 40th Annual ANZSES Conference*, 2002.
Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.
Phipps, Gary S., "Heliostat Beam Characterization System Calibration Technique," U.S. Department of Commerce, National Technical Information Service, Sandia Labs, SAND791532C, 1979.

(56) References Cited

OTHER PUBLICATIONS

Pottler et al., "Photogrammetry: A Powerful Tool for Geometric Analysis of Solar Concentrators and Their Components," Journal of Solar Energy Engineering, Feb. 2005, 127(1): pp. 94-101.

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

Rabl, A., "Tower Reflector for Solar Power Plan," *Solar Energy*, 1976, 18: pp. 269-271.

Stone, K.W., and Jones, S.A., "Analysis of Solar Two Heliostat Tracking Error Sources," Sandia National Laboratories, Report No. SAND99-0239C, Jan. 28, 1999.

Vant-Hull, L.L., and Pitman, C.L., "Static and Dynamic Response of a Heliostat Field to Flux Density Limitations on a Central Receiver," *Solar Engineering*, 1990, pp. 31-38.

\* cited by examiner

SYSTEMS AND METHODS FOR CONTROL OF A SOLAR POWER TOWER USING INFRARED THERMOGRAPHY

CROSS-REFERENCE TO RELATED APPLICATIONS

This application claims the benefit of U.S. Provisional Application No. 61/079,441, filed Jul. 10, 2008, the content of which is hereby incorporated by reference herein in its entirety.

FIELD

The present application relates generally to the conversion of solar radiation to usable forms of energy, such as heat and/or electricity, and, more particularly, to systems and methods for the control of a solar power tower using infrared thermography.

DESCRIPTION OF EMBODIMENTS

Embodiments of the disclosed subject matter can provide an efficient system for the conversion of solar radiation to thermal and/or electric energy, as well as components, articles of manufacture, and other technological improvements, and methods for using such.

In embodiments, a solar energy collection system may include a solar receiver which receives solar radiation directed onto an outward-facing external surface thereof and reflected from at least one heliostat. The receiver can include at least one fluid channel, such as one or more tubes for conveying a heat transfer or working fluid therethrough. The external surface may transmit thermal energy from the solar radiation received thereon to the conveyed fluid. A thermal imaging device may be positioned to detect infrared radiation reflected by and/or radiated by the external surface of the receiver. The thermal imaging device may measure temperatures of the external surface of the receiver based on the detected infrared radiation. For example, a two-dimensional development, or map, of the temperature over the surface may be generated, or data equivalent thereto. The controller can compute solar energy flux distribution based on the measured temperatures. Moreover, the controller may control aiming of the heliostats responsively to the computed incoming solar energy flux distribution. For example, the controller may change aiming points of the heliostats on or off the external surface of the receiver to achieve a more uniform energy flux distribution.

In embodiments, a method for controlling a solar energy collection system may include detecting infrared radiation emanating from an external surface of a receiver. The receiver may include at least one tube for conveying a fluid therethrough. The external surface may transmit thermal energy from the reflected solar radiation receiver thereon to the conveyed fluid. An incoming solar energy flux distribution on the external surface of the receiver may be determined at least in part based on the detecting infrared radiation. Heliostats may then be directed to reflect incoming solar radiation onto aiming points on or off the external surface of the receiver based at least in part on the determining an incoming solar energy flux distribution.

According to embodiments, the disclosed subject matter includes a solar energy collection system. The system has a plurality of heliostats and a solar receiver on which energy is directed by the heliostats. The receiver has a surface onto which the solar energy is directed. The surface may be the surfaces of tubes of a boiler (the term boiler covering both tubes carrying fluid in which a phase change occurs—i.e., literal boiling as well as tubes carrying superheated fluid such as steam). The receiver may also have other surfaces such as a panel welded to fluid conveyances. The tubes may also carry molten salt or other heat transfer fluid. The tubes may carry the working fluid of an engine such as a Brayton cycle turbine or steam turbine. The receiver may also be a photovoltaic receiver or include photovoltaic components in addition to a thermal receiver as mentioned. The receiver surface can transfer and/or convert energy either to a fluid or convert the energy directly into some other form. For example, radiant energy may be converted to thermal energy and transferred to a heat transfer or working fluid. Radiant energy may be converted to electrical by a photovoltaic portion of a photovoltaic receiver. In the system, a desired target distribution of radiant or captured energy flux distribution or temperature distribution over the surface is enforced through control of the heliostats based on feedback from radiant energy detectors.

The radiant energy detectors may be, for example, thermal imaging devices such as cameras. The imaging devices may be located at various positions around the receiver, which may have a surface that faces in multiple directions, some of which may be hidden from a given imaging device.

By positioning multiple imaging devices, the entire receiver surface can be imaged. The thermal imaging devices detect infrared radiation emanating from the receiver surface and provide first temperature signals indicative of a temperature at a location on the receiver external surface. Thus, the thermal imaging devices may be located such that the fields of view of the thermal imaging devices overlap such that at any given time each location on the receiver external surface is imaged by at least one of the thermal imaging devices which does not look into the sun. Each thermal imaging device may have a plurality of pixels and each pixel may receive energy from a corresponding portion of the receiver surface.

A weather station may be provided to measure instantaneous weather data at a location of the solar energy collection system and transmit the measured weather data to at least the plurality of thermal imaging devices. The weather data may be used to compensate for the influence of the weather on the thermal imaging data received by the imaging devices. For example, the weather data may be used to adjust the first temperature signals based on the transmitted weather data. The weather station may be local or centralized or the data may be derived from a broadcast or webcast data stream. A controller may compute incoming solar energy flux distribution based, at least in part, on the first temperature signals and predictive convective and radiative heat losses from the solar receiver. The controller may control the heliostats responsively to the computed solar energy flux distribution. In a receiver embodiment, in which the receiver has a plurality of tubes, each of the tubes may have a width that is of such size that it is imaged by more than one of the plurality of pixels in a direction of the tube width.

A temperature sensor may be positioned and configured to detect a temperature of a point on the external surface of the receiver and to generate a second temperature signal indicative thereof. The controller may use this second temperature indicator in combination with the first temperature signals to compute the solar energy flux or receiver surface temperature distribution. A temperature sensor may also or alternatively be positioned and configured to measure a temperature of fluid flowing through a fluid inlet of the receiver and to generate a temperature signal indicative thereof. The latter may be used to measure a temperature of fluid flowing through an outlet of the receiver and to generate a third temperature signal indicative thereof. The controller may be configured to compute the solar energy flux or temperature distribution based at least in part on the second and third temperature signals. A flowmeter may be provided to measure flowrate of fluid through the receiver and to generate a flowrate signal, wherein the controller computes the solar energy flux distribution based at least in part on the flowrate signal. So essentially, the heat gain by the fluid in respective parts of the receiver can be converted to a flux distribution. The heat gain can be measured based on flow rate and temperature change for each portion. A network of temperature sensors can be placed around the receiver for this purpose. The sensors can be located on tubes of a boiler, for example, within tubes or other fluid channel, on the surface of the receiver, or any other position for obtaining similar information.

The conveyed fluid may be transported from the receiver to a thermal power plant after receiving the transmitted thermal energy and used to generate electricity from thermal energy stored in the conveyed fluid. The conversion in the plant may be the use of a working fluid that was heated by the receiver or the transfer of heat energy from a heat transfer fluid to a working fluid in the plant, using a heat exchanger. The controller may be configured to, at any given time, predict which of the multiple imaging devices may be receiving radiant energy directly from the sun, due to its position and orientation at a given time, and to control without the use of the imaging information from that imaging device. The controller or another controller may be provided to put the imaging device in a safe mode at such times in which light is blocked from being received by the imaging device to protect it.

Objects, advantages, and features of the present disclosure will become apparent from the following detailed description when considered in conjunction with the accompanying drawings.

BRIEF DESCRIPTION OF THE DRAWINGS

Where appropriate, like reference numbers have been used to indicate like elements in the figures. Unless otherwise noted, the figures have not been drawn to scale.

DETAILED DESCRIPTION OF THE DRAWINGS AND FURTHER EMBODIMENTS

In general, the present disclosure is directed to methods, systems, and devices for directly monitoring energy flux of a solar receiver in a solar energy-based power generation system. When operating a solar power system that includes a solar receiver, it is desirable to know, for example, by means of measurement or calculation, the quantity of energy transferred to a heat transfer fluid flowing through the receiver, usually expressed as energy per unit of area, which is essentially the captured energy per unit area, or flux. The flux may vary over the receiver surface. A total flux for the receiver as a whole may be defined, which may be the sum of all the energy captured and transferred to the heat transfer fluid. An average over a subdivision of the receiver can also be defined, which is the total energy captured over the surface of the subdivision of the receiver. In the present description, the area over which the energy is accumulated should be clear from the context of the use of the term "flux." A used herein, an area associated with the flux is a theoretical smooth capture surface that follows the actual surface of the receiver (or receiver subdivision) but lacks any roughness attributable to fine surface features, such as boiler tubes. For example, a cylindrical or drum receiver would have a surface, for flux characterization, that is a simple geometric cylinder whose surface normal at all points of the surface passes through a longitudinal axis of the receiver. Similarly, a generally planar receiver would have a surface for flux characterization that is a simple geometric plane. Note also that, as used herein, the thermal flux can vary in real-time. Flux may be measured in real-time within the time resolution and/or lag of the measuring device.

A solar power tower system can include at least one tower and at least one set of heliostats. Each heliostat can track the apparent movement of the sun to reflect light to a target on a tower. The heliostats can be arrayed in any suitable manner, but preferably their spacing and positioning are selected to provide optimal financial return over a life cycle according to predictive weather data and at least one optimization goal such as total solar energy utilization, energy storage, electricity production, or revenue generation from sales of electricity.

One or more solar receivers may convert energy reflected from heliostats to some useful form of energy, such as heat or electricity. The receiver can be located at the top of a receiver tower or at some other location, for example if an intermediate reflector (also called a secondary reflector) is used to bounce light received at the top of a tower down to a receiver located at ground level or at an intermediate height.

Figure 1:
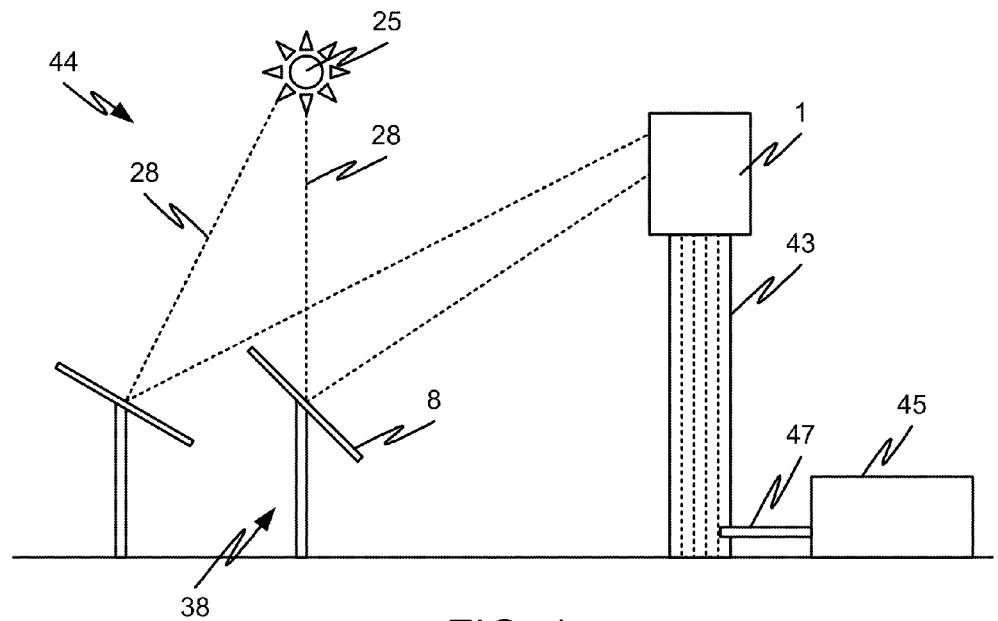
FIG. 1 is a diagrammatic elevation view of a solar power tower system.

Referring now to the figures and in particular to FIG. 1, a solar power tower system 44 is provided in which heliostats 38 include mirrors 8 that reflect incident solar radiation 28 onto a receiver 1. The heliostat-mounted mirrors 8 are capable of tracking the apparent movement of the sun 25 across the sky each day in order to maintain the reflective focus in the direction of the receiver 1 as the angle of the incident radiation 28 changes. The receiver 1 is located atop a tower 43. Solar energy reflected by the heliostats 8 is incident on receiver 1 so as to heat a fluid flowing therethrough. Heat energy stored in the fluid can then be used to generate heat or electricity. For example, pipe 47 can be connected to receiver 1 so as to transfer the heated fluid to a thermal power plant 45, whereby a turbine uses heat energy stored in the fluid to generate electricity.

Figure 2:
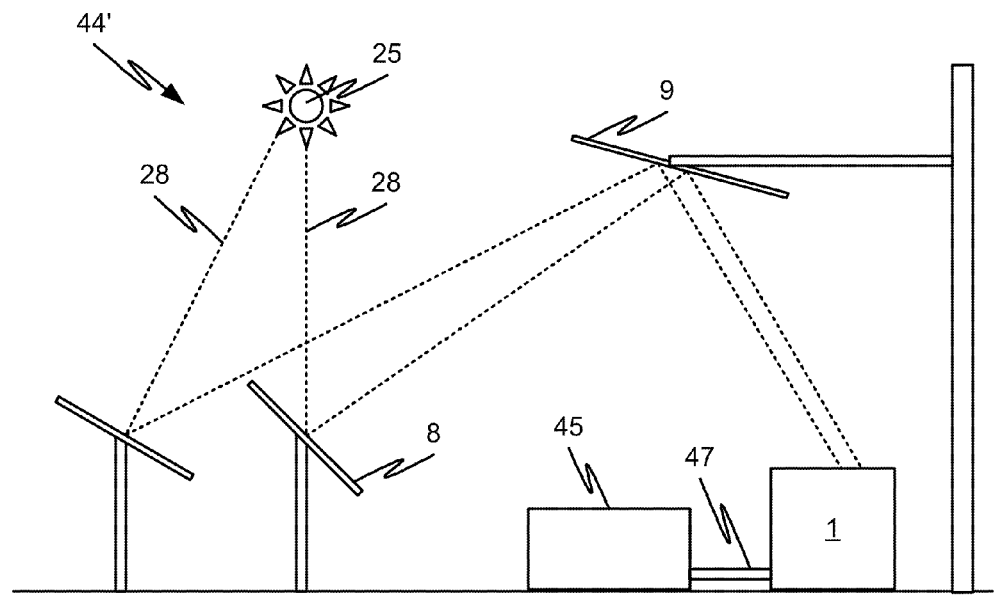
FIG. 2 is a diagrammatic elevation view of a solar power system.

In an alternative embodiment illustrated in FIG. 2, a solar power tower system 44' has the receiver 1 located on the ground. The heliostat-mounted mirrors 8 can reflect solar radiation onto one or more suspended mirrors 9 which further reflect the radiation onto the receiver 1.

A solar power tower system can also include a control system for helping the system operator or owner attain or maintain pre-defined operating parameters and/or constraints, some of which may be based on achieving optimization goals and some of which may be based on maintaining the safety of the system and its operation. For example, a control system can be used to ensure that distribution of light energy across the surface of the receiver is in accordance with a predetermined set of desired values, or it can be used to maximize conversion of energy from solar radiation to latent and/or sensible heat in a heat transfer fluid within the receiver while ensuring that local temperatures on the surface of the receiver do not exceed a predetermined local maximum. This predetermined set of desired values can include, but is not limited to, a uniform radiant energy flux distribution across the surface of the receiver or a predetermined non-uniform radiant energy flux distribution which results in optimal heat transfer to the fluid flowing through the receiver. The target distribution may be established in terms of radiant energy distribution, captured energy flux distribution, a resulting two-dimensional temperature distribution, or any other similar criterion that provides the control over the stresses generated by received energy on the receiver, such as temperature differential stresses. The predetermined set of values can take the form of a data map representing distribution across the surface of the receiver, which may be stored in a data storage associated with or separated from the controller. Such a data map may represent, for example, flux averages (radiant or captured) for target pixels across the surface of the receiver, such as those described below with reference to FIG. 7.

According to one or more embodiments, the control system can be centralized in a single computer or distributed among several or many processors. For example, a central control system can communicate hierarchically through a data communications network with controllers of individual heliostats. Such a hierarchical control system 130 is illustrated schematically in FIG. 3. The hierarchical control system 130 can include three levels of control hierarchy. However, embodiments are not limited to this number of levels of control hierarchy. Rather, additional or fewer levels of hierarchy are also possible according to one or more contemplated embodiments. Moreover, the entire data communications network can be without hierarchy, for example in a distributed processing arrangement using a peer-to-peer communications protocol.

Referring again to FIG. 3, at a lowest level of control hierarchy, programmable heliostat control systems (HCS) 65 control the two-axis (azimuth and elevation) movements of heliostats (not shown), for example, as the heliostats track the movement of the sun. At a higher level of control hierarchy, heliostat array control systems (HACS) 92, 93 can be provided. Each HACS 92, 93 can control operation of heliostats in heliostat fields 96, 97 respectively, by communicating with the programmable HCS 65 associated with those heliostats through a multipoint data network 94. Multipoint data network 94 can employ, for example, a network operating system such as CAN, Devicenet, Ethernet, or the like. At a still higher level of control hierarchy, a master control system (MCS) 95 can indirectly control the operation of heliostats in heliostat fields 96, 97 by communicating with HACS 92, 93 through network 94. MCS 95 can further control the operation of a solar receiver (not shown) by communication through network 94 to a receiver control system (RCS) 99.

Figure 3:
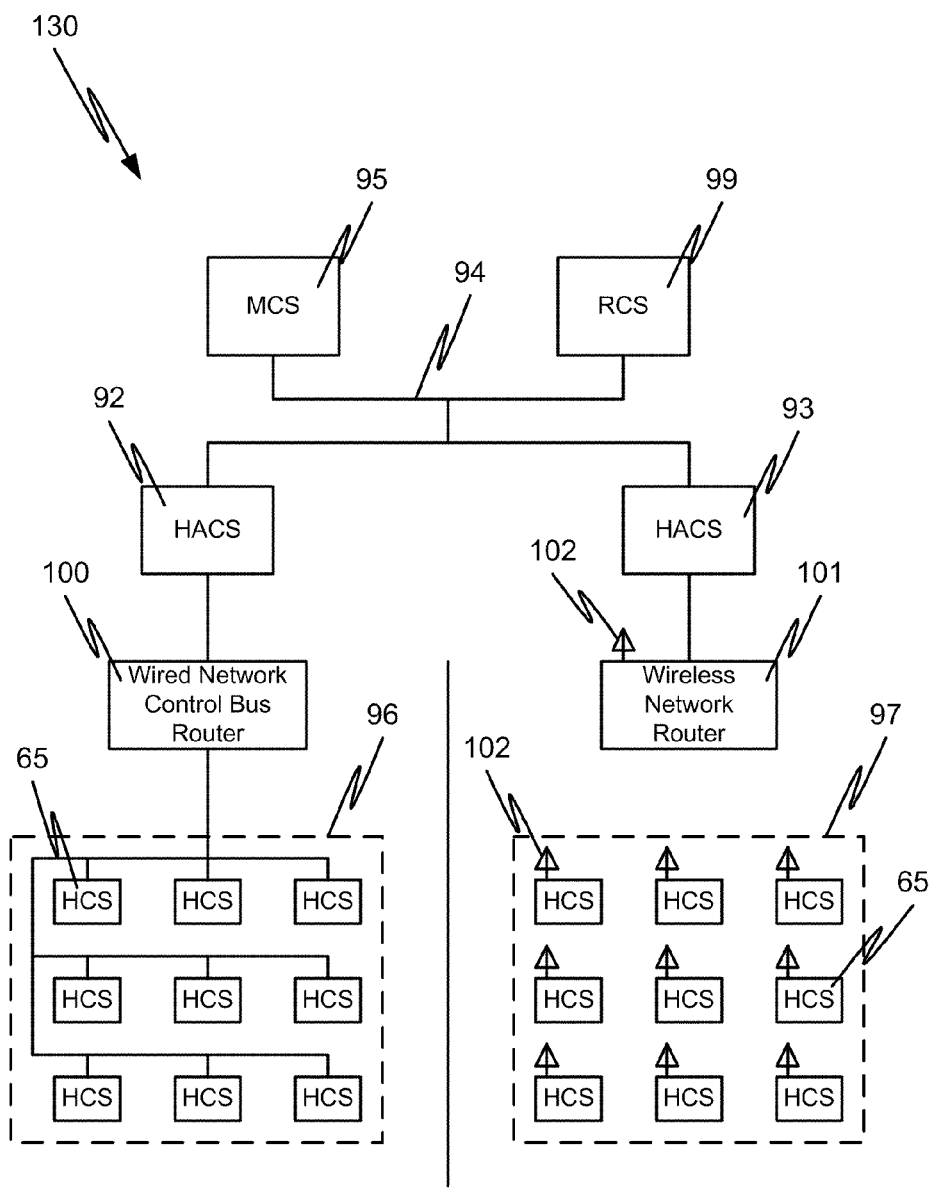
FIG. 3 is a block diagram of a hierarchical control system for a solar power tower system.

In FIG. 3, the portion of network 94 provided in heliostat field 96 can be based on hard-wire connections, such as copper wire or fiber optics connections. Thus, each programmable HCS 65 in heliostat field 96 can be equipped with a wired communications adapter (not shown). Similarly, MCS 95, HACS 92, and wired network control bus router 100 can also include a wired communications adapter for interfacing with HCS 65 through the hard-wire connections. Note that wired network control bus router 100 is optional and can be deployed in network 94 to handle communications traffic to and among the programmable HCS 65 in heliostat field 96 more efficiently.

In addition, the programmable HCS 65 in heliostat field 97 can communicate with HACS 93 through network 94 by means of wireless communications. Thus, each programmable HCS 65 in heliostat field 97 can be equipped with a wireless communications adapter 102. Similarly, HACS 93 and wireless network router 101 can also include wireless communication adapters 102 for interfacing with HCS 65 through wireless connections. Note that wireless network router 101 is optional and can be deployed in network 94 to handle network traffic to and among the programmable HCS 65 in heliostat field 97 more efficiently. Optionally, MCS 95 can also be equipped with a wireless communications adapter to interface with HACS 93 through a wireless connection rather than wired connections.

One of the primary functions of a control system can include directing heliostats to various aiming points on the surface of a receiver, or alternatively away from the surface of a receiver when operating conditions require. Such direction can be done on the basis of periodically or continuously evaluating various inputs to the control system. Such inputs can include, but are not limited to predictive and/or measured meteorological data as well as measured and/or calculated operating conditions and parameters of heliostats and receivers.

The operating conditions and parameters which can be used in applying control functions can include instant and historical temperature data for the external surface of the receiver, and instant and historical light energy flux density data for the external surface of the receiver. For example, the distribution of temperature across the surface of the receiver at a given moment can be compared with a pre-determined set of desired values, or with the data for an earlier moment in time, in order for the controller to decide whether current heliostat aiming instructions are adequate to meet system optimization goals or safety-based operational constraints, and especially when taking into account measured and predictive weather data.

Additionally or alternatively, the distribution of solar energy flux density across the surface of a receiver at a given moment can be compared with a predetermined set of desired values and/or used to calibrate a calculation of predicted flux densities used by a control system. The control system can generate sets of aiming points and can direct heliostats to those aiming points based on the difference between measured and predicted patterns of light energy flux density. For example, the distribution of incoming solar energy flux can be compared with a data map representing flux distribution across the surface of the receiver. Said data map can be stored in a data storage device, such as a volatile or non-volatile memory device, or magnetic or optical storage media. The data map can represent flux averages for certain target pixels, such as pixels 90 in FIGS. 7-8.

In embodiments, a control system can include a thermal imaging device which detects the infrared emissions of at least a portion of a receiver surface and assigns calculated temperatures to one or more points on the receiver surface based on the detected infrared emissions. The temperature data can be captured in digital form or translated to digital form by software used in conjunction with the thermal imaging device. For example, a suitable thermal imaging device can be a ThermoVision® A40M infrared camera (FLIR Systems, Boston, Mass., USA).

In embodiments, the thermal imaging device can have sufficient pixel resolution to provide a desired level of temperature detail with respect to the structure of the receiver. For example, the thermal imaging device can be positioned such that each individual tube in the imaged portion of the receiver is represented by at least one pixel. Alternatively, each tube panel can be represented by at least one pixel. Such a configuration may be useful when the design of the receiver is such that all the tubes in the panel have a known or predictable temperature relationship among them.

Receivers used for heating a heat transfer fluid such as water/steam or molten salts or metals can be constructed of vertical tubes or of panels of vertical tubes. In a rectangular array of pixels, the thermal imaging device can have sufficient resolution and placement relative to the receiver so as to assure that each individual tube is represented by at least one pixel in each horizontal row in the pixel array, and preferably for a majority of the horizontal rows in the array. For example, the thermal imaging device can have a 320×240 pixel resolution. In another example, a high-resolution thermal imaging device can have a 640×480 pixel resolution. Moreover, it is contemplated that as higher resolution thermal imaging devices become available and more affordable, such imaging devices may also be employed in embodiments of the solar power tower system. In embodiments, device resolution can be selected so as to achieve an imaging resolution of, for example, at least one pixel per tube in each horizontal row of pixels. In some embodiments, it may be desirable to have distinct temperature readings for different points on the circumference of the same tube within a horizontal row of pixels. Accordingly, this can be accomplished, for example, by having a resolution adequate to allocate eight or more pixels per row to each tube.

Figure 4:
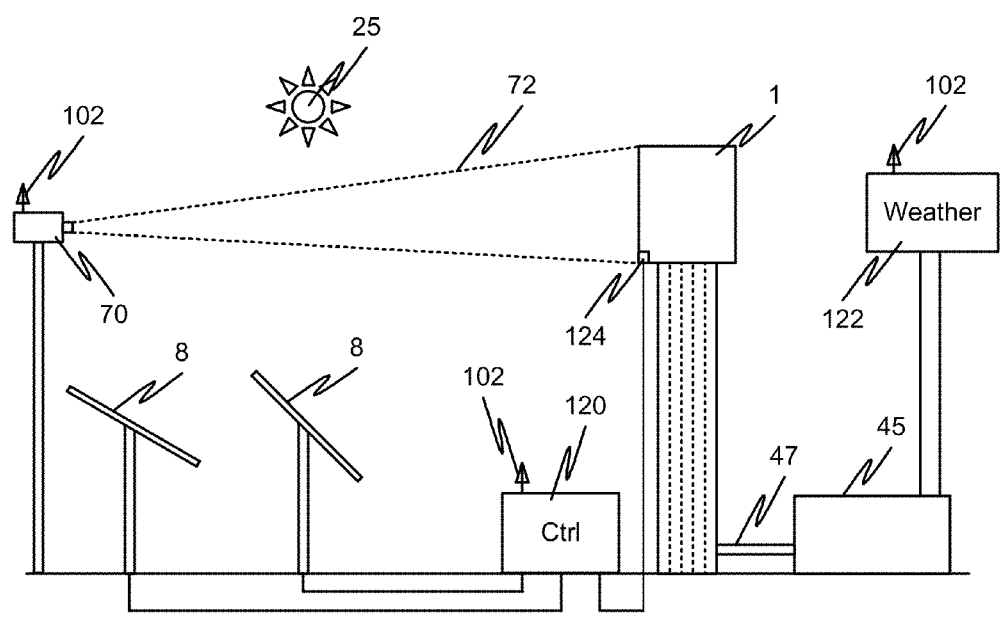
FIG. 4 is a diagrammatic elevation view of a solar power tower system with a thermal imaging device.

Referring now to FIG. 4, a thermal imaging device 70 is shown in a solar power tower system similar to that illustrated in FIG. 1. Thermal imaging device 70 can be positioned relative to other solar field components so as to capture thermographic images of the receiver 1 (e.g., infrared emissions emanating from the receiver 1) at a desired resolution. The thermal imaging device 70 can have a field of view 72 which encompasses at least a portion of an external surface of the receiver 1. The thermal imaging device 70 can transmit the resulting thermal image (i.e., temperature image of the external surface of receiver 1) to a controller 120. The thermal image can thus be indicative of temperatures at various points on the surface of the receiver 1. Transmission of the thermal image to the controller 120 can be effected by a wireless transmission link 102, or alternatively, by a wired transmission link (not shown).

A weather station 122 can also be arranged at the location of the solar power tower system. For example, the weather station 122 can be arranged within the field of heliostats 8, adjacent to thermal power plant 45, adjacent to the receiver 1, or at some other location in the vicinity of the solar power tower system. The weather station 122 may provide real-time, instantaneous weather data that is indicative of current weather conditions at the solar power tower system location. Such weather data can include, but is not limited to, temperature, wind speed, barometric pressure, and relative humidity. The weather station 122 may also provide predictive weather data, such as information about impending storms or cloud cover.

As ambient conditions can affect the accuracy of the temperature data obtained by the thermal imager 70, the weather data can be communicated to the thermal imaging device 70 so that the thermal imaging device 70 can calibrate itself. For example, the thermal imaging device 70 may use the measured relative humidity to adjust temperature readings according to an internal look-up table. Weather data can be transmitted to the thermal imaging device 70 at a sufficient rate so as to allow update of the thermal imaging device for every image frame taken, for example. The weather data may be communicated to the imaging device 70 from the weather station 122 by way of a wireless communication link 102 or a wired communication link (not shown). The weather data may also be provided to controller 120 for use in determining flux distribution.

The controller 120 can be configured to use the thermal image from the thermal imaging device 70 to calculate solar energy flux distribution on the external surface of the receiver. This calculation can additionally take into account predictive convective and radiative heat losses from the solar receiver. For example, the controller 120 can receive weather data, such as, but not limited to, ambient temperature, relative humidity, wind speed and/or wind direction, from a weather station 122. The controller 120 can then use the received weather data to predict convective and radiative heat losses from the receiver.

Based on the calculated solar energy flux distribution, the controller 120 can direct heliostats 8 to change their aiming points on (or off) the receiver 1 to achieve one or more system goals. For example, the controller 120 can compare the calculated solar energy flux distribution with a data map representing flux distribution across the surface of the receiver. The controller 120 can then redirect heliostats to provide greater flux to areas which are deficient with respect to the map, while redirecting heliostats away from areas which are greater than the map.

In embodiments, the control system can include at least one temperature sensor 124 (for example, a thermocouple) provided in proximity to a point on the receiver surface 1. The temperature sensor 124 can generate real-time data, which may be used to calibrate the calculated temperatures of the thermal imager 70 from time-to-time, on a regular periodic basis, or continuously. The data from the temperature sensor 124 can also be used to ensure that a known correlation with the temperatures calculated by the thermal imager 70 is maintained. In the event that the known correlation is not maintained, the control system can be configured to generate an alarm so as to bring the anomaly to the attention of a system operator.

Figure 5A:
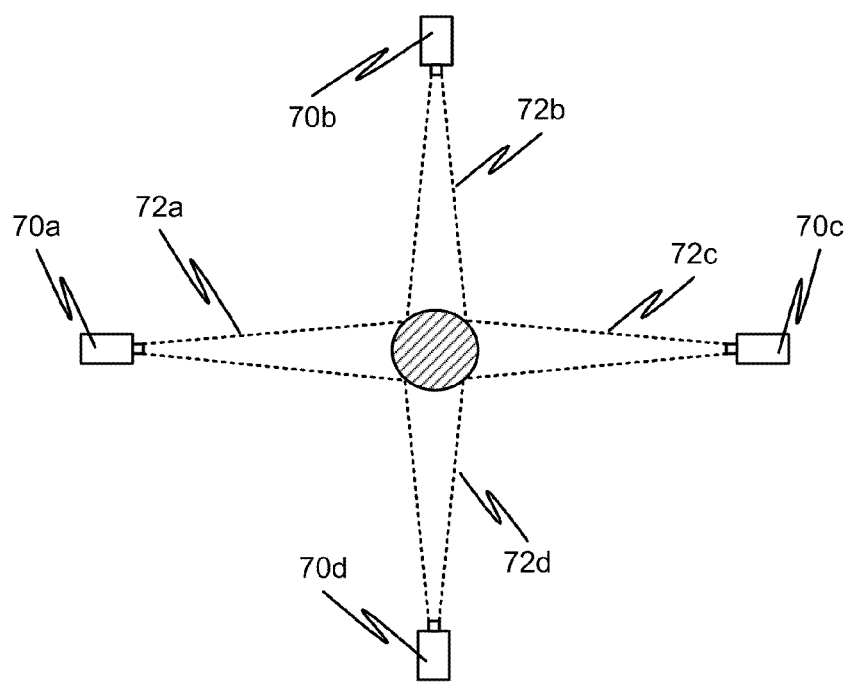
FIGS. 5A and 5B are diagrammatic plan views of a central solar power tower with a plurality of thermal imaging devices.
Figure 5B:
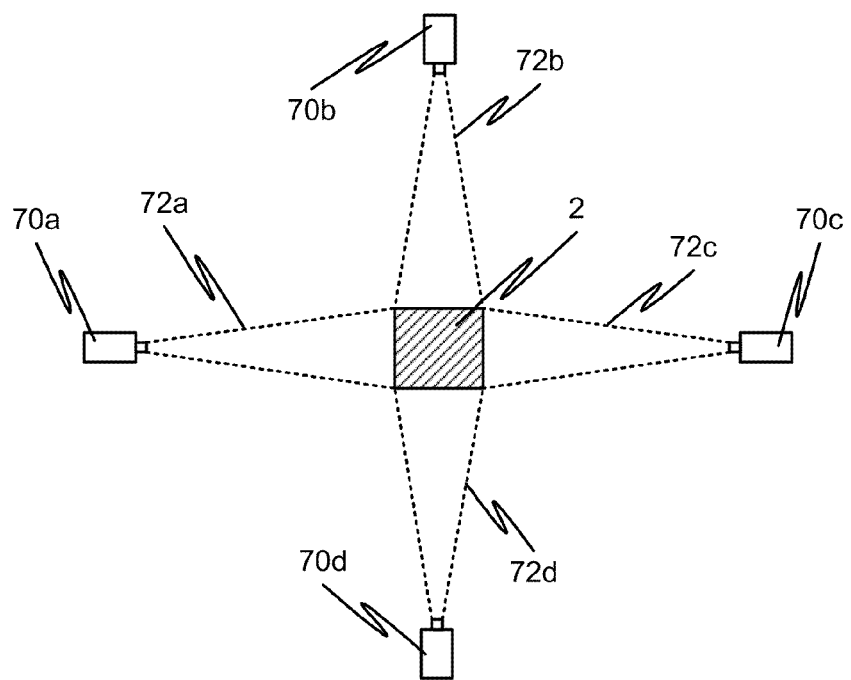

In embodiments, the control system can include a plurality of thermal imagers 70a-d, which cover (i.e., detect the infrared emissions of and assign calculated temperatures to) a plurality of portions of a receiver 1, as illustrated in FIGS. 5A-5B. The thermal imagers can be deployed so as to aggregately cover an entire receiver surface. For example, in the case of a cylindrical receiver 1 or a receiver with a quadrangular cross-section 2, it is conceivable that two thermal imagers could be deployed so as to aggregately cover an entire surface, but depending on imager resolution and field of view, it may be desirable to deploy more than two. As shown in FIGS. 5A and 5B, the fields of view 72a-d of the four thermal imaging devices 70a-d can respectively cover one quadrant of a cylindrical receiver 1 or one side of a substantially quadrangular receiver 2. Heliostats and other solar field equipment are not shown in the figure for purposes of clarity, but the placement of the thermal imagers should be accomplished while minimizing any potential occultation impacts with respect to the heliostat mirrors. Although only four thermal imagers are shown in the embodiments of FIGS. 5A-5B, embodiments of the solar power system are not limited to this number. Accordingly, more or fewer than four thermal imagers are possible according to one or more contemplated embodiments.

In embodiments, a control system can include a plurality of thermal imaging devices which aggregately cover more than one receiver. For example, a plurality of receivers can be arranged at different levels in a same tower, with different ones of the thermal imaging devices focused on different ones of the receivers. A single tower in a solar power tower system can use, for example, water and/or steam as a heat transfer fluid. The single tower can have a first receiver in which steam is generated from the water and a second tower in which steam is superheated. A third receiver can be dedicated to reheating of low-pressure steam. The low-pressure steam for the third receiver can be extracted, for example, from a Rankine-cycle turbine with a reheat cycle. In another example, different receivers can be arranged on different towers, with different ones of the thermal imaging devices focused on the different receivers. For example, an embodiment of different receivers on different towers can be provided according to the solar power tower system disclose in International Publication No. WO 2008/118980, published Oct. 2, 2008, entitled "Distributed Power Towers with Differentiated Functionalities", which is hereby incorporated by reference herein in its entirety.

Regardless of whether the multiple thermal imaging devices cover different sections of a single receiver or cover different receivers on one or more towers, the control system can be configured to aggregate the temperature data and alarms from multiple imagers and to represent the aggregated data graphically in a user interface. The control system may thus include appropriate software instructions, stored internally therein or on a computer readable medium used by the control system, for causing the control system to carry out the above-noted functions.

In embodiments, the control system can include a plurality of thermal images 70a-h, which cover (i.e., detect the infrared emissions of and assign calculated temperatures to) a plurality of portions of the receiver surface with overlapping fields of view 72a-72h. For example, the field of view 72a for thermal imager 70a can be arranged such that it has an overlapping region 73a with the field of view 72b for thermal imager 72b. Similarly, the field of view 72c for thermal imager 70c can be arranged such that it has an overlapping region 73c with the field of view 72b for thermal image 72b. Redundant temperature measurements can be taken by two different thermal imagers, thereby providing a fail-safe in the event one of the thermal imagers fails. The redundant temperature measurements can also be used by the control system in tandem, such as by averaging the two temperature measurements together, to account for variations in the accuracy of the thermal imagers.

Figure 6:
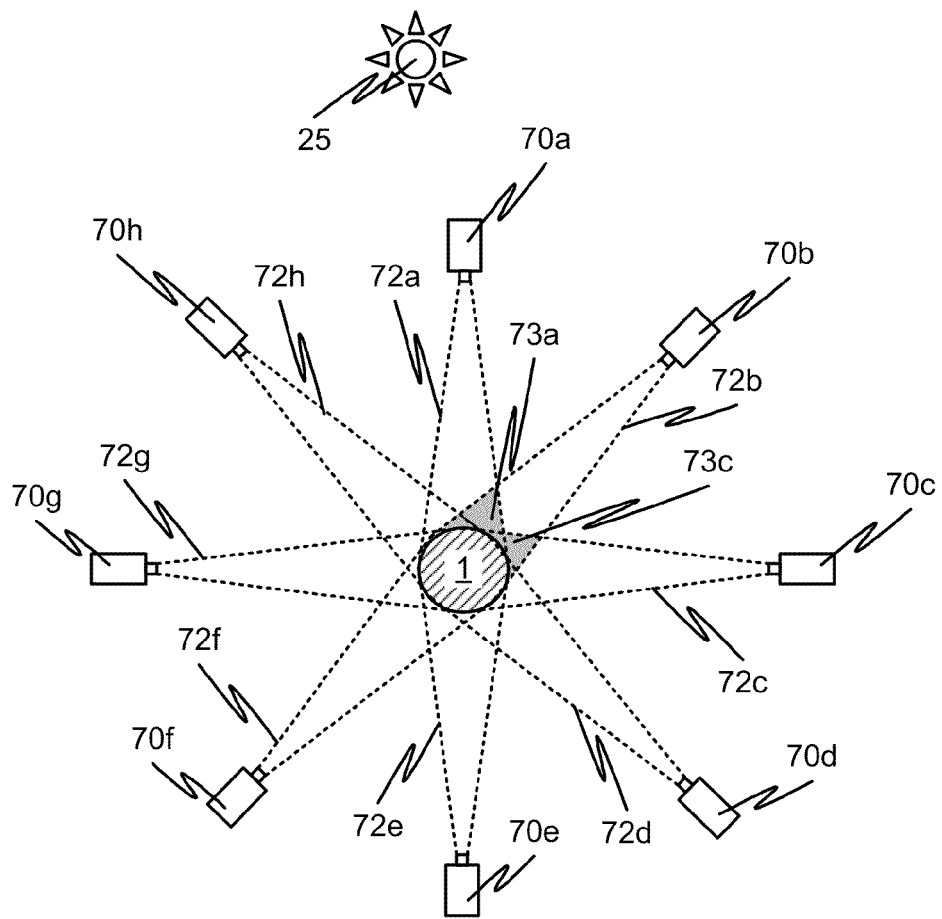
FIG. 6 is a diagrammatic plan view of a central solar power and a plurality of thermal imaging devices with overlapping fields of view.

At certain times of day and/or year, the sun 25 may be at such a position so as to enter the field of view 72 of one of the thermal imagers 70. The radiation incident on the sensor of thermal imager 70 due to the sun 25 may overwhelm the sensor, in effect blinding the thermal imager 70 and preventing accurate temperature readings of the receiver 1. The thermal imaging devices 70a-70h can thus be arranged with overlapping fields of view such that at any given time, each location on the external surface of the receiver is imaged by at least one of the thermal imaging devices which does not look into the sun. For example, with reference to FIG. 6, if the sun 25 is at such an angle that thermal imaging device 70e is blinded thereby, the redundant temperature measurements provided by thermal imaging devices 70f and 70d can be used instead. Heliostats and other solar field equipment are not shown in the FIG. 6 for purposes of clarity, but the placement of the thermal imagers should be accomplished while minimizing any potential occultation impacts with respect to the heliostat mirrors. Although only eight thermal imagers are shown in the embodiment of FIG. 6, embodiments of the solar power system are not limited to this number. Accordingly, more or fewer than eight thermal imagers are possible to provide the above desired effect according to one or more contemplated embodiments.

In embodiments, a thermal imaging device can be mounted on a manual and/or motorized base, which can be used to aim the camera at a plurality of regions on a receiver. The motorized base can be controlled by the camera control system, by the solar field controller, or by a system operator. Such a configuration may serve to reduce the number of thermal imaging devices needed for coverage of an entire receiver. For example, in the event that a thermal imaging device is positioned such that it has a field of view less wide than the section of receiver that is to be covered, the thermal imaging device can be positioned by a motorized base to image different portions of the receiver at different times. In this case, the controller can associate temperature data with a set of physical points on a receiver surface even as the thermal imaging device images different portions of the receiver surface so as to maintain a near-constant monitoring of the receiver surface. The control system may thus include appropriate software instructions, stored internally therein or on a computer readable medium used by the control system, for causing the control system to carry out the above-noted functions.

In embodiments, the control system can be configured to produce a monochromatic or pseudo-color graphic representation of the temperatures, using a graphical display device such as a computer screen or printer so as to make the temperature data more accessible to system operators. The pseudo-color graphic display may include a set of colors chosen to convey the complete range of temperatures that can be encountered in operation of a solar receiver, or alternatively may include a background color or set of background colors for those points where temperatures are within a predetermined set of desired or allowed values, and a different color or set of colors for those points where temperatures exceed or otherwise do not fall into the range of desired values. Such a predetermined set of desired or allowed values can include a normal operating temperature range for the solar receiver. For example, points within 'normal' limits may be shown as blue while points outside normal limits may be shown as red or white. The control system may thus include appropriate software instructions, stored internally therein or on a computer readable medium used by the control system, for causing the control system to carry out the above-noted functions.

In embodiments, the control system can produce a digital and/or graphic representation of time differential temperature data, i.e., data representing the change in temperature at each represented point over any desired time interval. A time interval may be adjustable by a user, by the control system, or by another cooperative system to produce a representation for a desired interval. The control system can be configured to show on an operator's screen a representation of at least a portion of a receiver surface including a plurality of points each representing the change in temperature over the selected time interval, for example, over the preceding one, two, five or ten minutes. The control system may thus include appropriate software instructions, stored internally therein or on a computer readable medium used by the control system, for causing the control system to carry out the above-noted functions.

In embodiments, the control system can include digital storage media chosen from any of the media types known in that art for storing data (e.g., magnetic, solid-state, optical). The control system can also store data on a regular or continuous basis. The control system can be configured to store temperature data at any desired time resolution, and optionally, to store graphic representations and/or differential temperature data. As an alternative to storing graphic representations, the control system can be configured to generate graphic representations on demand from data retrieved from the storage media. The control system may thus include appropriate software instructions, stored internally therein or on a computer readable medium used by the control system, for causing the control system to carry out the above-noted functions.

In embodiments, the solar power tower system can be configured to generate alarms that can be transmitted to a control system or to a control operator. For example, an alarm condition can cause a control system to respond in a preprogrammed manner, such as by shutting down equipment or re-aiming heliostats. Moreover, the alarm condition can also be communicated to a system operator visually and/or audibly. For example, an alarm can generated when a temperature deviates from pre-determined limits for a point or region, where the limits can apply to minimum, maximum, or mean temperatures. In an example, an alarm can be generated when differential data deviates from pre-determined limits for a point or region. Records of generated alarms can be recorded automatically in a data storage medium. The control system and/or solar power tower system may thus include appropriate software instructions, stored internally therein or on a computer readable medium used by the control system or solar power tower system, for causing the control system and/or solar power tower system to carry out the above-noted functions.

In embodiments, a method for controlling a solar power tower system can include generating calculated temperature readings of at least a portion of a receiver through the use of infrared thermography. For example, a solar power tower system can operate with a molten salt heat transfer fluid. Temperature readings obtained from infrared thermography can be used to monitor compliance with predetermined temperature limits. In the event that a local "hotspot" develops, the control system can selects heliostats to be defocused from the receiver in order to relieve the hotspot condition.

The method can also include calculating time differential temperatures, i.e., changes in temperatures over a selected period of time. For example, the heat transfer fluid in a solar power tower system can be water and/or steam. Temperature readings obtained from infrared thermography can be used to monitor compliance with predetermined limits for the time differential temperatures with respect to a specified time interval. In the event that temperature at a point or region on the surface of a receiver rises less than is required by the predetermined limits for the specified time interval, the control system can ensure that a periodic re-aiming of the heliostats causes more solar energy flux to be directed at the deficient point or region.

The method can also include comparing the temperature readings or time differential temperature values with a pre-determined set of values, where the comparing is performed by a data processing system. For example, the time differential temperature values can be compared with a data map representing ideal or desired time differential temperature values for the given time of day, given time of year, and/or given operating conditions. The result of the comparison can include an algorithmic decision to change heliostat aiming, i.e., to reallocate heliostats to different parts of a receiver or even to different receivers in a multi-receiver or multi-tower system. For example, if the comparison of measured time differential temperature values with the data map reveals areas of the receiver that are less than the data map, heliostats can be reallocated to focus on the deficient region of the receiver.

The result of the comparison can also include producing an alarm, for example when temperatures or temperature differentials deviate from a predetermined set of values, such as a data map of optimal temperature differential values. The predetermined set of values can be changed based on operating conditions or during different times of day. In addition, different allowable temperature ranges can be provided on different portions of the receiver surface at different times of day. For example, the temperature ranges can take into account the changes in efficiency of the heliostats on the eastern and western sides of the solar fields in morning and afternoon due to the relatively more or less advantageous incident angle of solar radiation. In addition, a different range of allowable temperatures can be provided during daily start-up, or during or after transient operating fluctuations, such as those caused by passing clouds.

In embodiments, the method can also include providing instructions to heliostats to change aiming points (or to defocus) on the basis of an alarm or on the basis of the comparing of temperature values or differential temperature values with a set of predetermined values. For example, a control system can evaluate the result of the temperature value comparison and subsequently use this evaluation as a consideration in its algorithmic designation of aiming points and assignment of heliostats to aiming points. This may include defocusing of some heliostats (aiming them away from the receiver) and may include reallocating the energy from some heliostats by re-aiming them to different points on the surface of the receiver. Alternatively, it may include a complete 'reshuffle' of heliostats and aiming points, geared at achieving a temperature value or differential temperature value distribution that is more compliant with operating guidelines while achieving system optimization goals within the limitations of known or programmed constraints.

The method can also includes creating a storage archive of data and using that data for revising solar field control instructions, techniques or performance models or model parameters.

In embodiments, a method for controlling a solar power tower system can include using temperature readings calculated by a thermal imaging system from infrared emissions of at least a portion of a receiver surface to calculate solar energy flux density values for a plurality of points on the receiver surface. The calculation can take into account predicted convective and radiative heat losses from the receiver. At least some of the data used to predict heat losses can include measured weather/meteorological data (for example, wind speed or ambient temperatures). For example, heat flux transferred to a heat transfer fluid flowing through the receiver can be based on the sum of heat loss by convection, heat loss by radiation, and reflected solar energy flux incident on the receiver surface. The heat loss due to convection and radiation can be predicted based on system configuration and operating conditions. In embodiments, the heat transfer fluid can be a gas, such as steam, a liquid, such as water, molten salts or metals, a two-phase liquid, such as water and steam, or a supercritical fluid, such as carbon dioxide or steam. The heat flux transferred to the heat transfer fluid (e.g., the thermal energy absorbed per unit area) can be calculated from temperature and/or differential temperature values and measurements of mass and/or volume flow of the heat transfer fluid within the receiver. Flux density can then be calculated based on the resulting heat energy flux values and the area of respective portions of the receiver surface.

Figure 7:
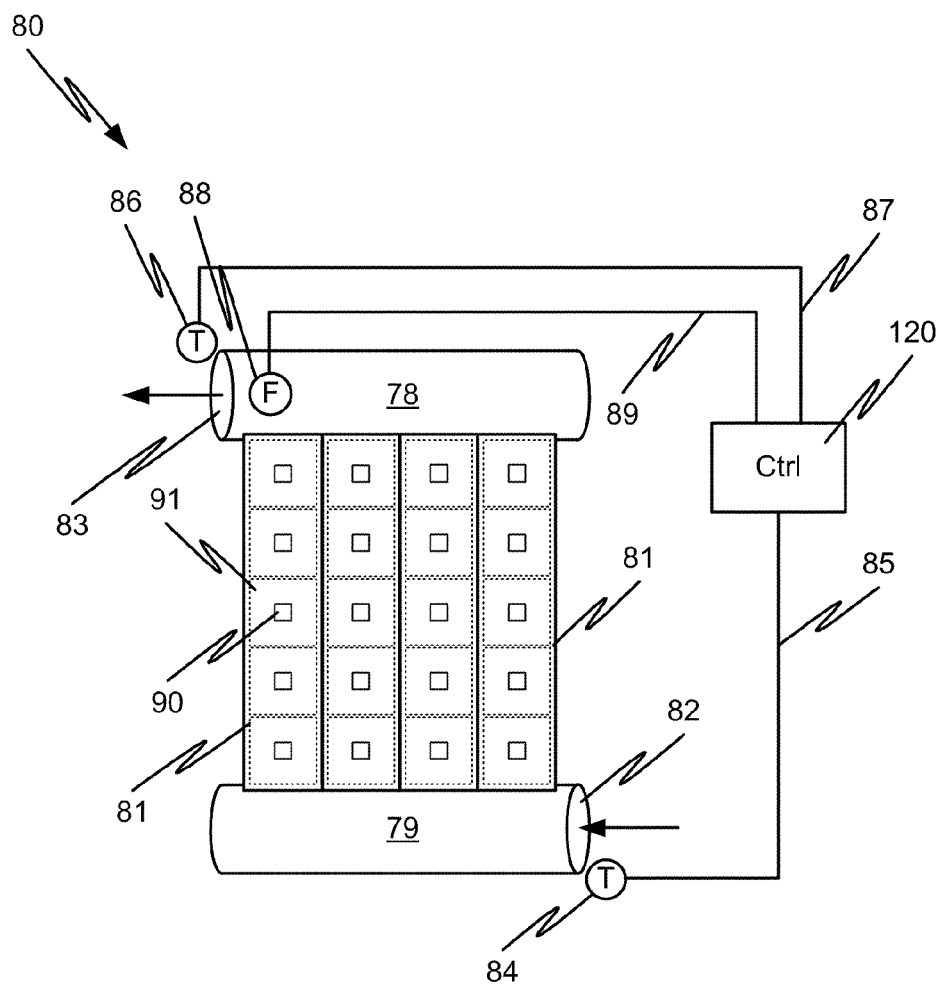
FIG. 7 is an elevation view of a receiver tube panel in a solar power tower system.

FIG. 7 illustrates an example in which solar energy flux density can be calculated according to embodiments of the method for controlling a solar power tower system. Irrespective of the simplified illustration, a tube panel may be several meters high and may include a large number (tens or hundreds) of heat transfer fluid tubes. Tube panel 80 can include a plurality of tubes 81 through which a heat transfer fluid (not shown) can be conveyed, entering the tube panel through inlet 82 of header pipe 79 and exiting from header pipe 78 through outlet 83. The tube panel is exposed to solar energy reflected from a field of heliostats, and the heat transfer fluid is heated thereby. Although not illustrated in FIG. 7, header pipes 78, 79 can be shielded from direct solar energy flux by placing them behind the tubes 81 or covering them with refractory material.

Thermocouples 84 and 86 can be located in proximity to inlet 82 and outlet 83, respectively. The thermocouples 84 and 86 can be positioned so to measure the temperature of the heat transfer fluid at each of those two points. The thermocouples 84, 86 can be connected to a control system 120 by wires 85 and 87, respectively. Alternatively, one or both thermocouples can be connected to control system by wireless data communication instead of wires 85, 87.

A flowmeter 88 with data connection 89 can be provided so as to measure flow of the heat transfer fluid in terms of either mass or volume, and to provide that data to a control system 120. Alternatively, mass flow through the tube panel 80 can be approximated by dividing a predictive value for thermal energy absorbed in the heat transfer fluid by the change in enthalpy of the heat transfer fluid from inlet to outlet. The change in enthalpy can be derived from the change in temperature measured, for example, by thermocouples 84, 86.

A predictive value for thermal energy absorbed in a receiver can be calculated with a high degree of accuracy by controller 120 or a performance model, as is known in the art, on the basis of available weather/meteorological and geometric data. The net heat flux for the tube panel 80 can thus be calculated by dividing the temperature difference between the outlet thermocouple 86 and inlet thermocouple 84 by the mass flow for a specific time interval and the specific heat of the heat transfer fluid. In addition, the predicted convective and radiative heat losses can be calculated as functions of the surface area and average temperature of the tube panel 80, emissivity of the tube panel 80 and any coating that may be applied to its surface, ambient temperature, and wind speed and direction (together with the shape of the tube panel and its attitude with respect to the wind direction, which jointly determine the extent to which airflow is laminar or turbulent). These predictive heat losses can be added to the previously calculated heat flux to obtain the gross solar energy flux, which can then be divided by the surface area of the tube panel 80 to obtain an average solar energy flux density for the entire tube panel 80.

Flux density can also be calculated for subdivisions of a tube panel. The number of subdivisions can be as many as are necessary for providing data that can be subsequently used for generating alarms or forming the basis for determining whether the current allocation of heliostats to aiming points on the surface of a receiver is adequate for achieving system optimization goals within established operating and safety constraints. Referring further to FIG. 7, a tube panel 80 can include a plurality of virtual subdivisions 91, which aggregately cover at least a portion of the surface of the tube panel 80 and preferably cover substantially the entire surface of the tube panel 80.

Each subdivision 91 can correspond to the fraction of the tube panel's surface area covered by a single pixel of resolution in a thermal imaging device provided in accordance with embodiments of solar power tower system. For greater resolution of the solar energy flux density calculation, a virtual subdivision 91 can be located within the confines of a single tube 81. In another example, a thermal imaging device can be provided with resolution and field of view selected so as to ensure that multiple pixels in each horizontal row are available for each tube. Each pixel of the thermal imaging device can correspond to a smaller subdivision 90 of the surface area of the tube panel 80. In this case, a temperature reading from the thermal imaging device for the smaller subdivision 90 can be used for calculating the average solar energy flux density for a larger subdivision 91 surrounding smaller subdivision 90. Alternatively, the temperature reading from the thermal imaging device for the smaller subdivision 90 can be used for calculating the average solar energy flux density for the area between each two non-contiguous smaller subdivisions 90. If smaller subdivisions are sufficiently small, i.e., because thermal imaging resolution is sufficiently high, then the smaller subdivisions 91 can be mathematically treated as points on the receiver surface.

During steady-state operating conditions when the temperature in a subdivision may be substantially constant over short time intervals, solar energy flux density can be calculated by using a temperature differential between adjacent subdivisions 90 or 91, i.e., the respective subdivision and the one upstream of it in terms of heat transfer fluid flow. The area for which the local solar energy flux density is calculated can depend on the shape and size of each subdivision for which a temperature reading from the thermal imaging device is available. During transient operating conditions, such as a cold start-up, the calculation of the solar energy flux density for a subdivision 90 or 91 can be performed by dividing the temperature differential over a selected time interval by the mass flow in that subdivision (or in a plurality of subdivisions) for the same time interval and the specific heat of the heat transfer fluid, and then adding the calculated predictive heat losses (as above) that can be allocated to the respective fraction of the tube panel surface.

In embodiments, the calculation of solar energy flux at a point on the surface of a receiver can be compared with a prediction of solar energy flux that takes into account at least one physical or geometric parameter or calculation. These parameters and calculations can include, but are not limited to: calculations of reflected beam shape; measured, calculated or predicted atmospheric attenuation; shadowing and blocking of heliostats in a solar field; solar declination; respective azimuth and elevation angles of the sun and of heliostat mirror surfaces; and mirror shape. The prediction can include using one or more of these parameters to estimate projections of reflected light energy and to create a predicted aggregated map of solar energy flux density corresponding to at least a portion of the receiver surface.

Figure 8:
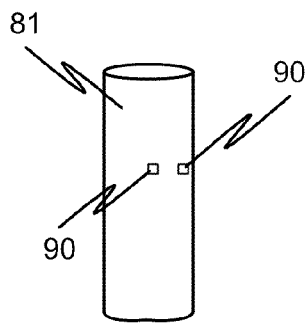
FIG. 8 is a partial elevation view of one receiver tube used in a receiver tube panel.

In embodiments, the calculation of solar energy flux on a region of a tube can be performed on the basis of temperature values at a plurality of points on the circumference of a tube, where the plurality of points are at substantially the same height. For example, as shown in FIG. 8, a plurality of smaller subdivisions 90 can include a plurality of points at substantially the same height on the circumference of a tube 81. An empirically-derived formula for solar energy flux can be based on the difference in temperature between the two points. The temperature readings can be obtained from infrared thermography, as described above. The empirically-derived formula may be applicable during steady-state operation of the receiver, i.e., not during transient operations such as a cold start-up.

In embodiments, the method can include performing infrared thermography of the receiver surface and producing differential temperature data therefrom. The time differential signal can then be used to predict solar energy flux intensity at a particular point on the receiver surface. For example, a thermal model can be generated for the receiver surface based on the type of surface (i.e., evaporative, superheating, etc.) as well as weather and other system conditions. Flux intensity can be calculated using this thermal model, for example, by the control system, which would generate the produced time differential temperature data when taking into account the thermal inertia of the system.

In embodiments, the method can include performing optical imaging instead of or in addition to infrared thermography. The optical imaging can be used to provide a measure of the optical flux incident on the receiver surface. The receiver surface may be untreated with regard to optimal reflectivity for the optical imaging. In other words, the receiver surface may be highly absorptive with regard to optical wavelengths such that most of the reflected solar energy incident thereon is absorbed and transferred to a heat transfer fluid flowing therethrough. In order for the optical imager to provide a measure of the optical flux intensity, a control system may take into account variables such as, but not limited to, the angle of incidence and angle of reflection of light received by the optical imaging device and the angle of the sun and the angle of the heliostats with respect to the surface of the receiver. A model of baseline reflectivity of the surface of the receiver as a function of temperature can also be used by the optical imaging device and/or the control system in determining optical flux intensity on the receiver. Such a model may be determined empirically, for example. The control system may use the optical imaging alone or in combination with the thermal imaging device to determine solar energy flux incident on the receiver surface and to control aiming of the heliostats in response thereto.

In embodiments, the method can further include calibration of calculated solar energy flux density values using actual values obtained from direct measurement of solar energy flux density at a plurality of points on or in proximity to the receiver surface. For example, the calculation of solar energy flux at points on the surface of a receiver using thermal imaging can be calibrated by measuring the intensity of light reflected from diffusely reflecting elements on the surface of the receiver, as described in co-pending U.S. patent application Ser. No. 12/269,793, filed Nov. 12, 2008, entitled "Solar Receiver with Energy Flux Measurement and Control," which is hereby incorporated by reference herein in its entirety.

In another example, the calculation can be calibrated using actual values obtained by measuring energy converted by photovoltaic cells capable of efficient photovoltaic conversion of concentrated sunlight and provided on the surface of or in proximity to the receiver. A module capable of efficient photovoltaic conversion of concentrated sunlight can be one that incorporates multi-junction or multi-bandgap photovoltaic cells. For example, the photovoltaic cell can be an EMCORE T1000 Triple-Junction High-Efficiency Solar Cell (EMCORE Photovoltaics, Albuquerque, N.M., USA).

In yet another example, the calculation can be calibrated using values obtained by measuring actual heat flux with an appropriate sensor, such as a differential thermocouple. Such a thermocouple can include a 1000-series water-cooled Thermogage (Vatell Corporation, Christiansburg, Va. USA). The differential thermocouple can be used, for example, to measure heat flux at a point on a membrane wall of a steam generation tube panel. Another example of an appropriate sensor is one based on a differential thermocouple that allows measurement of heat flux through the thickness of a tube wall.

In embodiments, calculated and/or measured values for solar energy flux density on the surface of a receiver can be used by a control system and/or system operator in order to determine whether current allocation of heliostats to aiming points on the surface of a receiver is adequate for meeting system optimization goals within predetermined operating and safety constraints. For example, a system optimization goal can be maximization of conversion from solar energy to latent and/or sensible heat absorbed in a heat transfer fluid, and a constraint can be that solar energy flux densities on the surface of a receiver are within predetermined limits for each of a plurality of points on the surface of the receiver. When a calculated or measured solar energy flux density value is found to be higher than a predetermined limit for a specific point for a particular operating regime (such as steady-state operation or cold start-up), then a control system can reallocate heliostats in such a way that the affected point on the receiver surface receives less solar energy flux. Alternatively, when the calculated or measured value is too low, then reallocation of heliostats can take that into account so that the affected point receives more solar energy flux.

Certain features of this invention may sometimes be used to advantage without a corresponding use of other features. While specific embodiments have been shown and described in detail to illustrate the application of principles of the invention, it will be understood that the invention may be embodied otherwise without departing from such principles.

It is, thus, apparent that there is provided, in accordance with the present disclosure, systems and methods for the control of a solar power tower using infrared thermography. Many alternatives, modifications, and variations are enabled by the present disclosure. Features of the disclosed embodiments can be combined, rearranged, omitted, etc., within the scope of the invention to produce additional embodiments. Accordingly, Applicants intend to embrace all such alternatives, modifications, equivalents, and variations that are within the spirit and scope of the present invention.

The invention claimed is:

1. A solar energy collection system comprising:
a plurality of heliostats;
a solar receiver which receives on an external surface thereof solar radiation reflected from the plurality of heliostats, the receiver including a plurality of tubes for conveying a fluid therethrough, external surfaces of the tubes forming at least a portion of the receiver external surface, the external surfaces of the tubes transmitting energy from the reflected solar radiation received thereon to the conveyed fluid;
a plurality of thermal imaging devices which detect infrared radiation emanating from the receiver external surface and provide first temperature signals indicative of a temperature at a location on the receiver external surface,
each thermal imaging device having a plurality of pixels, the external surface of each of the tubes being imaged by at least one of the plurality of thermal imaging devices, fields of view of the thermal imaging devices overlapping such that each portion of the receiver external surface is imaged, wherein at any given time at least one of the plurality of thermal imaging devices does not look into the sun;
a weather station which measures instantaneous weather data at a location of the solar energy collection system and transmits the measured weather data to at least the plurality of thermal imaging devices, the thermal imaging devices adjusting the first temperature signals based on the transmitted weather data; and a controller which computes solar energy flux distribution incident on the external surface of the solar receiver from the plurality of heliostats based at least in part on the first temperature signals and predictive convective and radiative heat losses from the solar receiver, and controls the plurality of heliostats responsively to said computed solar energy flux distribution, wherein the predictive convective heat loss is based on the measured weather data including at least one of relative humidity, wind speed, and wind direction.

2. The solar energy collection system of claim 1, wherein each of the tubes has a width and the external surface of each of the tubes is imaged by more than one of the plurality of pixels in a direction of the tube width.

3. The solar energy collection system of claim 1, further comprising a temperature sensor configured to detect a temperature of a point on the external surface of the receiver and to generate a second temperature signal indicative thereof, the controller being configured to compute the solar energy flux distribution based at least in part on the second temperature signal.

4. The solar energy collection system of claim 1, further comprising a first temperature sensor configured to measure a temperature of fluid flowing through an inlet of the receiver and to generate a second temperature signal indicative thereof, a second temperature sensor configured to measure a temperature of fluid flowing through an outlet of the receiver and to generate a third temperature signal indicative thereof, wherein the controller is configured to compute the solar energy flux distribution based at least in part on the second and third temperature signals.

5. The solar energy collection system of claim 1, further comprising a flowmeter configured to measure flowrate of fluid through the receiver and to generate a flowrate signal based thereon, wherein the controller is configured to compute the solar energy flux distribution based at least in part on the flowrate signal.

6. The solar energy collection system of claim 1, wherein the weather station transmits instantaneous or predictive weather data to the controller, the controller computing the solar energy flux distribution at least in part on the received weather data.

7. The solar energy collection system of claim 1, wherein the conveyed fluid is transported from the receiver to a thermal power plant after receiving the transmitted thermal energy so as to generate electricity from thermal energy stored in the conveyed fluid.

8. A solar energy collection system comprising:
a plurality of heliostats;
a solar receiver which receives on an external surface thereof solar radiation reflected from the plurality of heliostats, the receiver including at least one tube for conveying a fluid therethrough, the external surface transmitting thermal energy from the reflected solar radiation received thereon to the conveyed fluid;
a first thermal imaging device which detects infrared radiation emanating from the external surface of the receiver and measures temperatures of the external surface of the receiver based on the detected infrared radiation; and
a controller which computes solar energy flux distribution incident on the external surface of the solar receiver from the plurality of heliostats based on the measured temperatures from the first thermal imaging device, predictive convective and radiative heat losses from the solar receiver, and a flowrate of the conveyed fluid.

9. The solar energy collection system of claim 8, wherein the controller is configured to control aiming of the at least one heliostat responsively to the computed solar energy flux distribution.

10. The solar energy collection system of claim 8, wherein the controller is configured to use time-differential temperature readings of the measured temperatures of the external surface of the receiver to compute solar energy flux distribution.

11. The solar energy collection system of claim 8, further comprising a second thermal imaging device which has a field of view directed at the external surface that does not overlap with a field of view of the first thermal imaging device.

12. The solar energy collection system of claim 8, further comprising a second thermal imaging device which has a field of view directed at the external surface that overlaps with a field of view of the first thermal imaging device.

13. The solar energy collection system of claim 8, wherein the controller is configured to receive instantaneous or predictive weather data from a weather station and to compute the solar energy flux distribution at least in part on the received weather data, the predictive convective loss being based on said instantaneous or predictive weather data including at least one of relative humidity, wind speed, and wind direction.

14. The solar energy collection system of claim 8, wherein the receiver external surface includes an external surface of the at least one tube, each tube having a width, the thermal imaging device having a plurality of pixels and being arranged such that the tube external surface is imaged by more than one of the plurality of pixels in the direction of the width.

15. A solar energy collection system comprising:
a plurality of heliostats;
a solar receiver which receives on an external surface thereof solar radiation reflected from the plurality of heliostats, the receiver including a plurality of tubes for conveying a fluid therethrough, external surfaces of the tubes forming at least a portion of the receiver external surface, the external surfaces of the tubes transmitting energy from the reflected solar radiation received thereon to the conveyed fluid;
a plurality of thermal imaging devices which detect infrared radiation emanating from the receiver external surface and provide first temperature signals indicative of a temperature at a location on the receiver external surface,
each thermal imaging device having a plurality of pixels, the external surface of each of the tubes being imaged by at least one of the plurality of thermal imaging devices,
fields of view of the thermal imaging devices overlapping such that each portion of the receiver external surface is imaged, wherein at any given time at least one of the plurality of thermal imaging devices does not look into the sun;
sensors configured to measure operating conditions of the solar receiver and to generate at least one operating condition signal indicating transfer of heat from the solar receiver to a heat transfer fluid circulating therein; and
a controller configured to calculate energy transfer data responsive to convective and radiative heat losses from the solar receiver and energy flux distribution incident on the external surface of the solar receiver from the plurality of heliostats, responsively to the first temperature signals and the at least one operating condition signal, and controls the plurality of heliostats responsively to said energy transfer data
wherein the controller is further configured to calculate said energy transfer data based at least in part on a flowrate of the conveyed fluid.

16. The system of claim 15, further comprising a weather station configured to generate weather data including at least one of relative humidity, wind speed, and wind direction, wherein the energy transfer data are indicative of predictive convective and radiative heat losses, the predictive convective heat loss being based on the measured weather data.

17. The solar energy collection system of claim 15, wherein each of the tubes has a width and the external surface of each of the tubes is imaged by more than one of the plurality of pixels in a direction of the tube width.

18. The solar energy collection system of claim 15, wherein the sensors configured to measure operating conditions include a temperature sensor configured to detect a temperature of a point on the external surface of the receiver and to generate a second temperature signal indicative thereof, the controller being configured to calculate the energy transfer data based at least in part on the second temperature signal.

19. The solar energy collection system of claim 15, wherein the sensors configured to measure operating conditions include a first temperature sensor configured to measure a temperature of fluid flowing through an inlet of the receiver and to generate a second temperature signal indicative thereof, a second temperature sensor configured to measure a temperature of fluid flowing through an outlet of the receiver and to generate a third temperature signal indicative thereof, wherein the controller is configured to calculate the energy transfer data based at least in part on the second and third temperature signals.

20. The solar energy collection system of claim 19, wherein the sensors configured to measure operating conditions further include a flowmeter configured to measure the flowrate of the conveyed fluid through the receiver and to generate a flowrate signal based thereon, wherein the controller is configured to calculate the energy transfer data based at least in part on the flowrate signal.

21. The solar energy collection system of claim 15, wherein the sensors configured to measure operating conditions further include a flowmeter configured to measure the flowrate of the conveyed fluid through the receiver and to generate a flowrate signal based thereon, wherein the controller is configured to calculate the energy transfer data based at least in part on the flowrate signal.

22. The solar energy collection system of claim 21, wherein the fluid through the receiver is transported from the receiver to a thermal power plant after receiving the transmitted thermal energy so as to generate electricity from thermal energy stored in said fluid.

23. The solar energy collection system of claim 8, further comprising a flowmeter configured to measure said flowrate of the conveyed fluid through the receiver and to generate a flowrate signal based thereon, wherein the controller is configured to compute the solar energy flux distribution based at least in part on the flowrate signal.

24. A method for controlling a solar energy collection system, the system including a receiver and a plurality of heliostats, comprising:
detecting infrared radiation emanating from an external surface of the receiver, the receiver including at least one tube for conveying a fluid therethrough;
determining a solar energy flux distribution incident on the external surface of the receiver from the plurality of heliostats based at least in part on the detecting infrared radiation and predictive convective and radiative heat losses from the solar receiver; and
directing the heliostats to reflect incoming solar radiation onto aiming points on the external surface of the receiver based at least in part on the determining a solar energy flux distribution,
wherein the predictive convective loss is based on measured weather data including at least one of relative humidity, wind speed, and wind direction,
the detecting infrared radiation includes imaging the external surface of the receiver using a plurality of thermal imaging devices, and
the determining a solar energy flux distribution at any particular time uses data from only those of the thermal imaging devices that do not look into the sun at that particular time.

25. The method according to claim 24, wherein the detecting infrared radiation, determining a solar energy flux distribution and directing the heliostats are repeated continuously during operation of the solar energy collection system.

26. The method according to claim 24, wherein the plurality of thermal imaging devices has overlapping fields of view.

27. The method according to claim 24, further comprising detecting temperatures of fluid conveyed into and out of the receiver, wherein the determining a solar energy flux distribution is based at least in part on the detecting temperatures of fluid conveyed.

* * * * *